United States Patent [19]

Koh

[11] Patent Number: 4,754,129

[45] Date of Patent: Jun. 28, 1988

[54] GRATING ADJUSTMENT APPARATUS OF 3-BEAM TYPE OPTICAL PICK-UP

[75] Inventor: Young-San Koh, Daejeon, Rep. of Korea

[73] Assignee: Samsung Electronics Co. Ltd, Rep. of Korea

[21] Appl. No.: 31,939

[22] Filed: Mar. 27, 1987

[30] Foreign Application Priority Data

Mar. 31, 1986 [KR] Rep. of Korea .................. 86-2438

[51] Int. Cl.$^4$ ................................................ G11B 21/02
[52] U.S. Cl. .................................... 250/202; 250/556; 369/44
[58] Field of Search ................... 250/202, 557, 570; 369/43–46

[56] References Cited

U.S. PATENT DOCUMENTS

| | | | |
|---|---|---|---|
| 4,234,837 | 11/1980 | Winslow | 250/202 |
| 4,541,084 | 9/1985 | Oku et al. | 369/46 |
| 4,561,080 | 12/1985 | Yamazaki | 369/46 |
| 4,615,023 | 9/1986 | Inada et al. | 250/202 |
| 4,651,314 | 3/1987 | Yoshikawa et al. | 369/45 |

*Primary Examiner*—Edward P. Westin
*Assistant Examiner*—Charles Wieland
*Attorney, Agent, or Firm*—Handal & Morofsky

[57] ABSTRACT

This invention relates to a grating adjustment apparatus of 3-beam type optical pick-up for the compact disk player and, more particularly, to an apparatus automatically and readily adjusting a grating to the angle where the target value of a tracking error signal is obtainable. Sub-beam currents from the optical pick-up is, through current-voltage transducing amplifiers, converted into voltage signals, which are applied to a differential amplifier. The differential amplifier puts out the tracking error signal mixed with noise, which passes through a band pass filter removing said noise. So only pure tracking error signal is obtained, which is, after its phase is compensated by the low frequency lag compensator, applied to a differentiator. This signal is applied to a discriminator. When the tracking error signal detected by the discriminator is far smaller than the lowest limit of the target value of the grating adjustment, a jig actuator regulates the grating angle in the direction that said signal can be increased, by rotating a motor. In the end, the target value of the tracking error signal is obtainable. When the tracking error signal detected by the discriminator is larger than the target value, a system controller generates an amplifier enable signal making the discriminator produce a grating adjustment stop signal and a tuned indicating signal, whereby the motor driving stage generates a signal for braking the motor. In the end, the target value of the tracking error signal is maintainable.

3 Claims, 7 Drawing Sheets

F I G. 1a
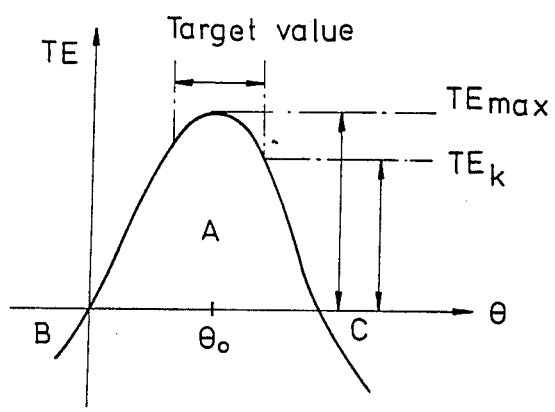
F I G. 1b
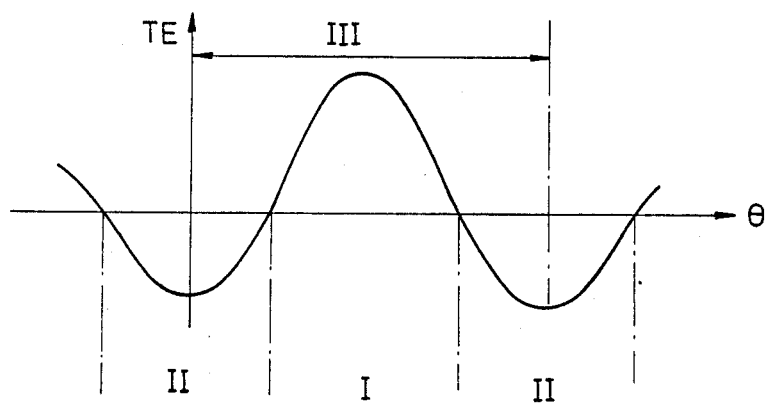

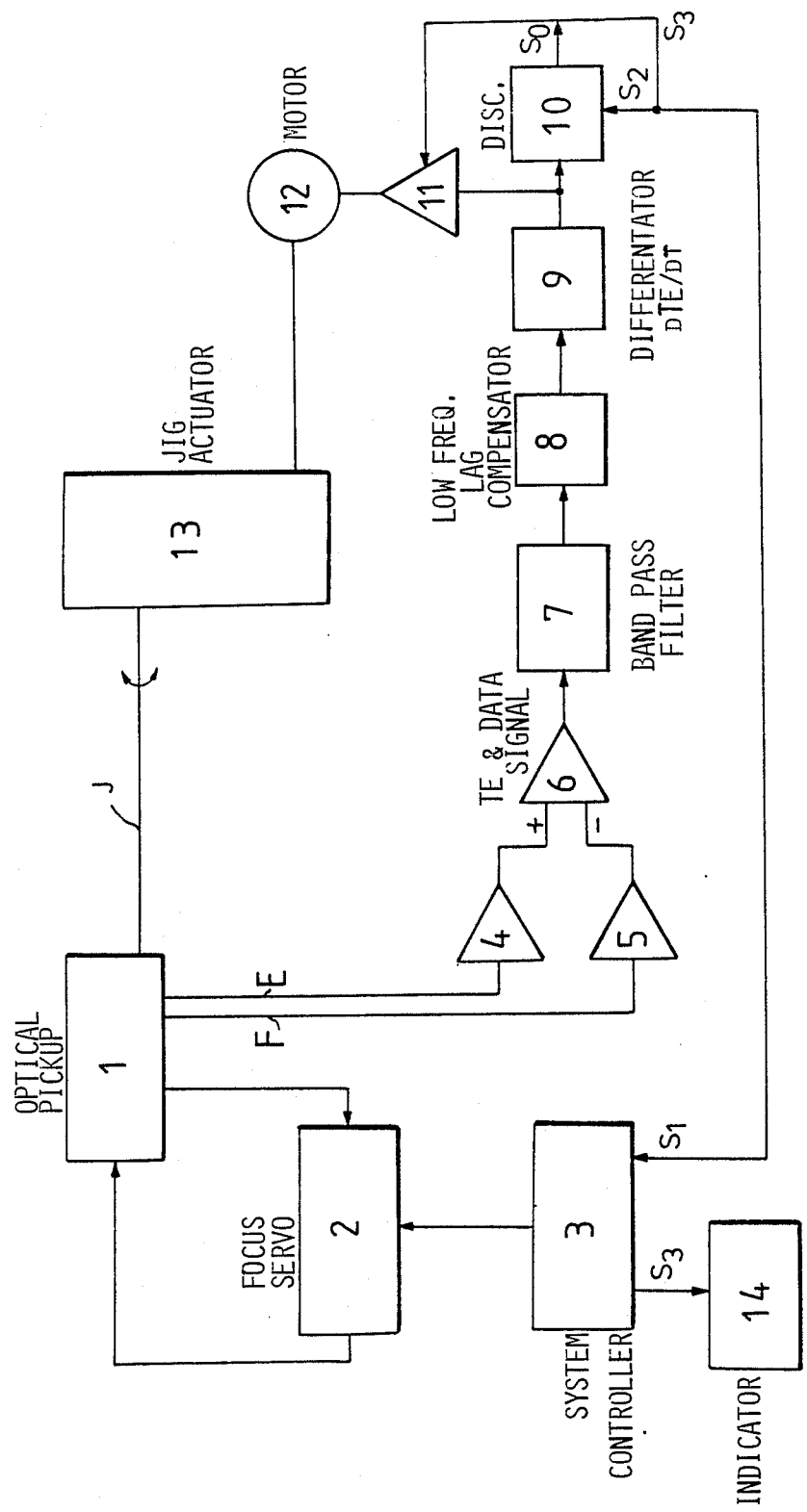

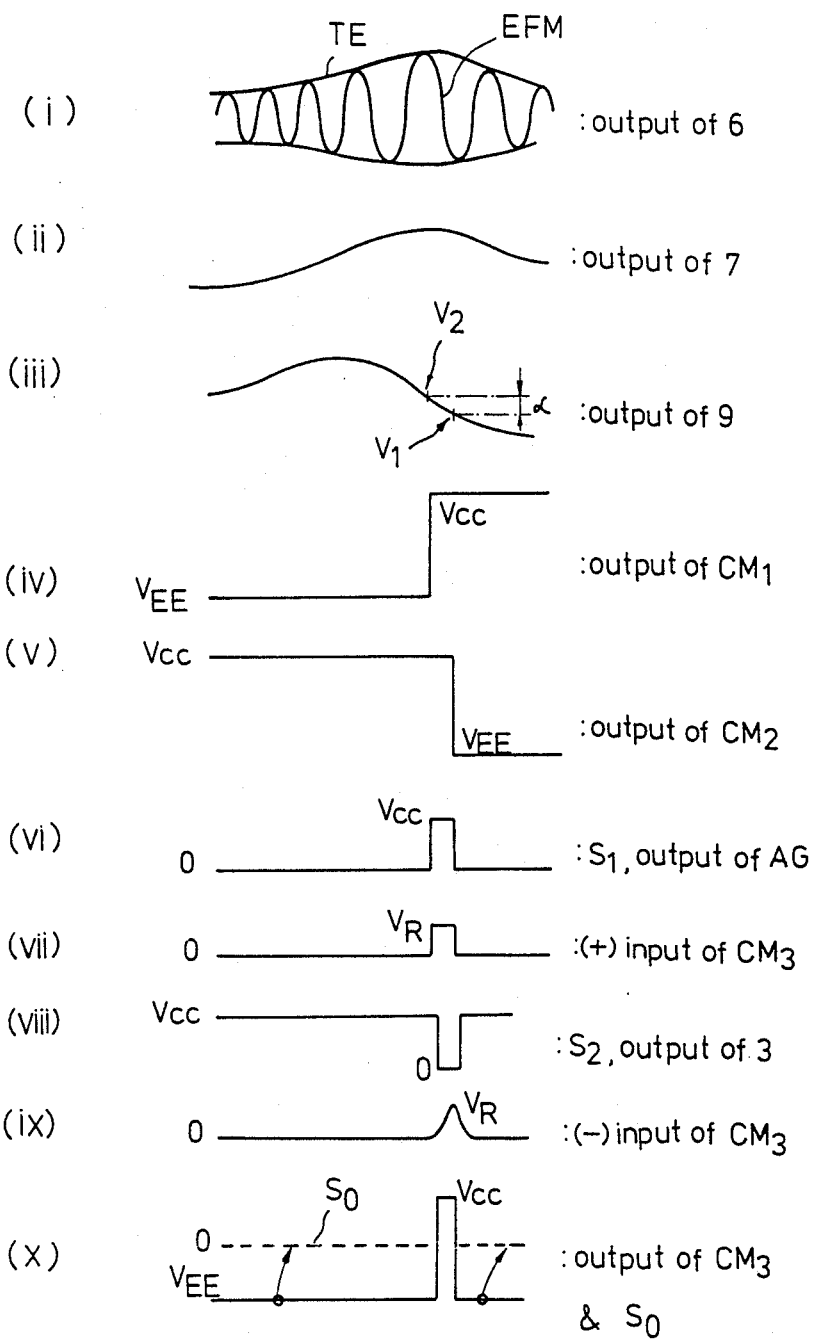

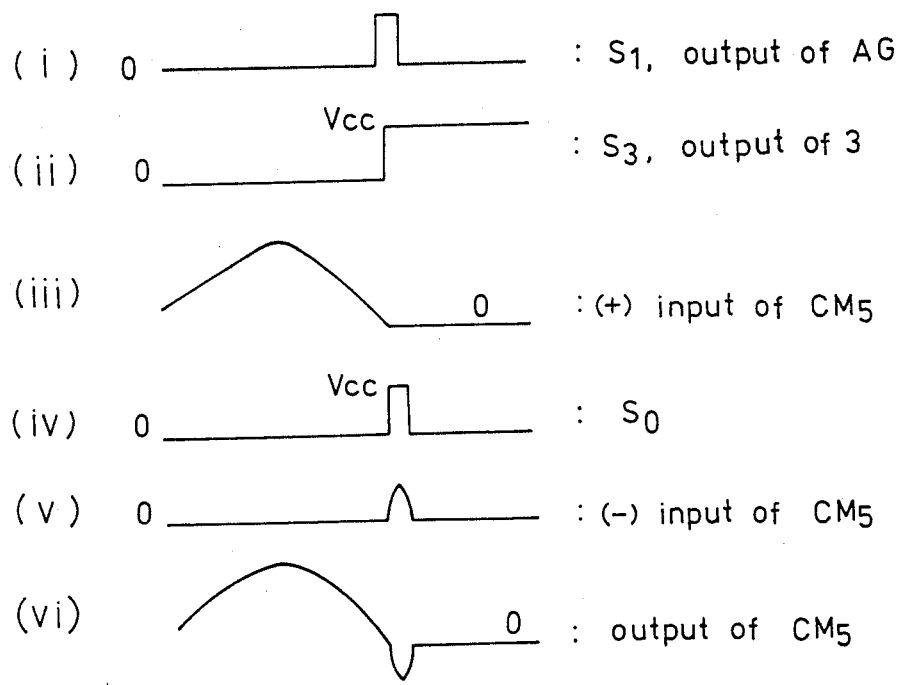

GRATING ADJUSTMENT APPARATUS OF 3-BEAM TYPE OPTICAL PICK-UP

BACKGROUND OF THE INVENTION

1. Field of the Invention

The present invention relates to a grating adjustment apparatus of a 3-beam type optical pick-up and, more particularly, to an improved grating adjustment apparatus used in assembling of a 3-beam type optical pick-up for automatically and readily adjusting a grating angle to obtain a tracking error signal which is larger than the designated value in condition that two sub-beams of 3 laser beams are scanned on the same track of a compact disk.

2. Description of the Prior Art

As for a tracking method of a compact disk player using three laser beams, grating adjustment plays an important role in stability of a tracking servo. Grating adjustment must be made to obtain the maximum magnitude of a tracking error, but it is inconvenient to adjust the magnitude of a tracking error minutely with a manual adjustment means. In details, if a tracking error is observed and adjusted with an equipment such as a voltmeter or an oscilloscope, it is very difficult to measure a tracking error with the naked eye because a tracking error TE is $\Sigma|a(w)|e^{jwt}$. Though a general low pass filter is also utilized, an accurate grating adjustment cannot be accomplished in the end.

Furthermore, because a grating degree adjustment extent of a general optical pick-up is restricted within a target value $\pm 0.3°$, it is so difficult to be adjusted accurately by the hand and therefore, it has demerit that work efficiency was dull.

SUMMARY OF THE INVENTION

It is an object of the present invention to provide a grating adjustment apparatus which can automatically adjust the value of a tracking error within TEmax(the maximum value of a tracking error)—TEmax$\times$0.1.

It is another object of the present invention to a grating adjustment apparatus which notifies users of completion of grating adjustment by an indicator.

BRIEF DESCRIPTION OF THE DRAWINGS

The present invention may best be understood by reference to the following description, taken in connection with the accompanying drawings in which:

FIG. 1a and FIG. 1b are graphs showing variation of a tracking error against a grating angle, FIG. 2 is a block diagram of the embodiment of the present invention.

DETAILED DESCRIPTION OF THE INVENTION

Figure 3:
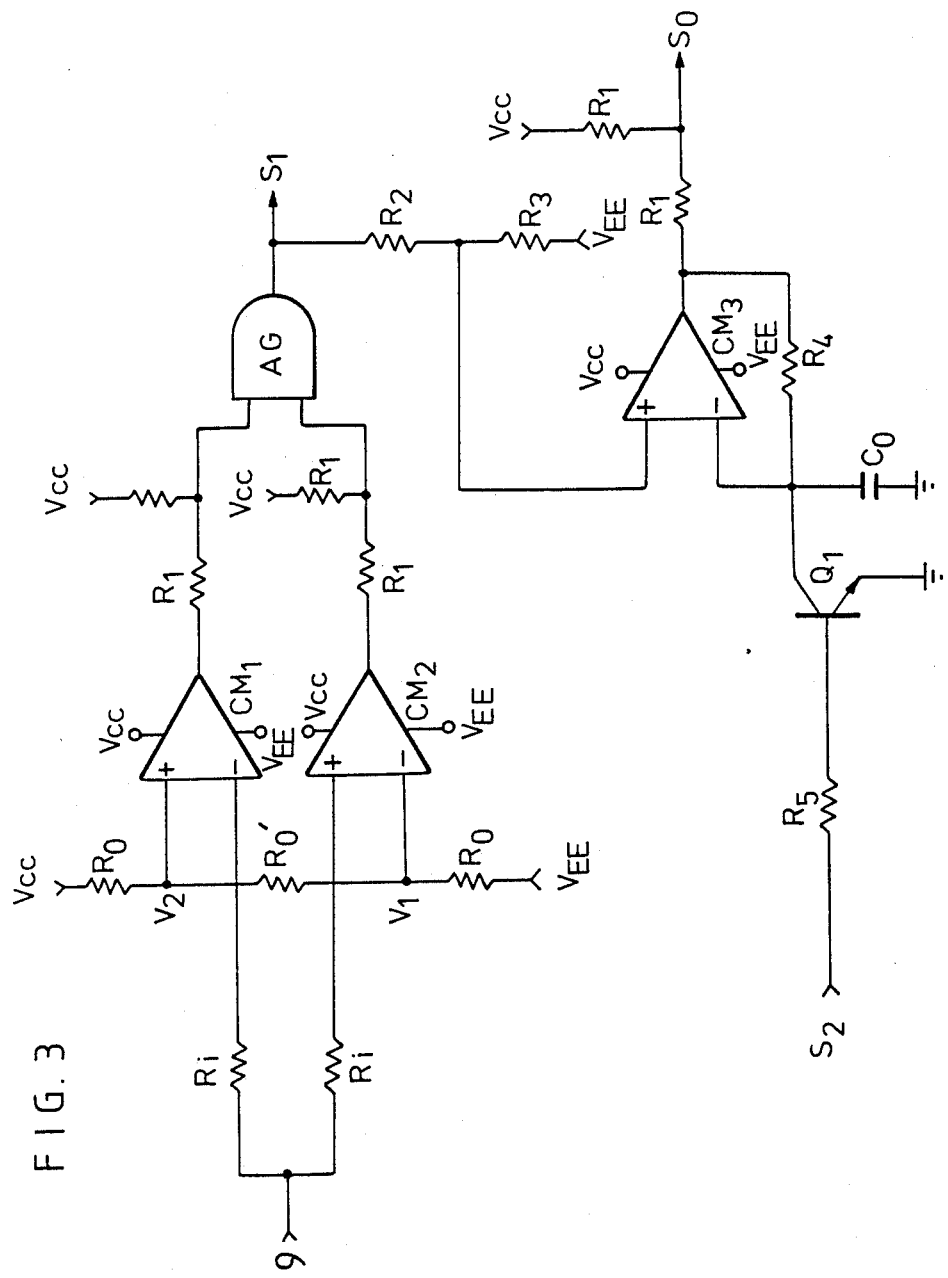
FIG. 3 is a detailed circuit diagram of the discriminator shown in FIG. 2.

Referring to FIG. 1a, there is shown the magnitude of a tracking error TE with respect to a grating angle $\theta$, where, within the scope of the area A, a tracking error has the positive value and a tracking servo unit can act normally, and, within the scope of the areas B and C, the tracking error has the negative value and the tracking servo unit cannot act normally. That is, the tracking servo unit acts normally in the scope of the area A and, when a grating angle is set at an angle $\theta_0$ where the tracking error becomes the maximum magnitude in the area A, the tracking servo unit can act under the optimum condition.

But it is very difficult to adjust a grating angle to said angle $\theta_0$ because of irregular reflection of a disk and nonuniformity of a track and so on. Accordingly a grating angle is usually set at such a degree that the magnitude of the tracking error may be larger than a certain value.

When the optical pick-up is mounted on a deck mechanism and the grating angle comes into the area I of FIG. 1b (i.e. on track area), the sub-beams from the optical pick-up are mutually scanned on the same track of a compact disk and the tracking error occurs normally. So normal tracking operation is accomplished.

If the grating angle comes into the area II of FIG. 1b owing to assembling tolerance of the deck and optical pick-up, the tracking error having the negative value occurs and so, the tracking operation becomes incapable.

If the grating angle is restricted in the area III of FIG. 1b owing to assembling tolerance of the deck and optical pick-up, it is very difficult to adjust the grating angle to the maximum point of the tracking error accurately. Accordingly, as for the present invention, the target value of automatic grating adjustment is chosen as TEk=TEmax$\times$K (Here, K is above 0.9).

FIG. 2 illustrates a block diagram of the grating adjustment apparatus of the 3-beam type optical pick-up according to the embodiment of the present invention. Reference numeral 1 designates an optical pick-up which scans laser beam on a compact disk and reads the signal recorded in the compact disk. A focus servo unit 2 controls the focus distance between the compact disk and the optical pick-up, and a system controller 3 regulates operation of the focus servo unit 2.

Transducing amplifiers 4 and 5 respectively convert sub-beam currents E and F from said optical pick-up 1 into the corresponding voltages and also amplify said voltages. And their outputs are applied to the differential amplifier 6, so that the tracking error may be generated. However, strictly speaking, the signal from the differential amplifier 6 is represented as the mixture of said tracking error signal TE, the main data signal 'EFM signal' (Eight to Fourteen Modulation signal) and the channel noise occuring from external disturbance and nonuniformity of a disk.

In respect of the present invention, both of the main data signal and the channel noise is called to as "noise" for convenience' sake, since the tracking error signal alone is utilized.

A band pass filter 7 has the bandwidth which removes the noise from the output of the differential amplifier 6 and so extracts a pure tracking error signal.

A low frequency lag compensator 8 makes phase compensation for the output of the differential amplifier 6, in order to stabilize the unstable characteristics of the open loop gain of the apparatus according to the present invention.

By doing the lead compensation of the high frequency and restricting the bandwidth of the open loop gain, said compensator 8 improves the resonance peak value of the closed loop gain. To this end, the finite zero b of the transfer function $s+b/s+a$ of the compensator 8 is determined to be larger than the finite pole a of the transfer function.

The differentiator 9 produces the derivative variable dTE/dt of the output of the compensator 8 with respect to time variable. The discriminator 10 distinguishes the output level of said differentiator 9. When the output level |dTF/dt| of the differentiator 9 within the predetermined voltage range $\alpha$ is applied to the discriminator 10, the signal for stopping the grating adjustment operation is generated from the discriminator 10.

FIG. 3 illustrates a detailed circuit diagram of the discriminator 10. Two resistors Ri and Ri are input resistors of comparators CM1 and CM2. One of the both is connected to the inverting input terminal of the comparator CM1 and the other is connected to the noninverting input terminal of the comparator CM2. The resistor Ro' is connected between the noninverting input terminal of the comparator CM1 and the inverting input terminal of the comparator CM2, and the resistors Ro and Ro' are respectively connected between the power source Vcc and the noninverting input terminal of the comparator CM1 and between the power source $V_{EE}$ and the inverting terminal of the comparator CM2.

The discriminating reference voltage range $\alpha$ for the output level of the differentiator 9 is decided by the resistors Ro, Ro and Ro'. The value of the range $\alpha$ is decided upon the characteristics of the optical pick-up and the deck, and the target value of grating adjustment.

As to the embodiment of the present invention, the negative reference voltage V1 is applied to the inverting input terminal of the comparator CM2 and the positive reference voltage V2 is applied to the noninverting input terminal of the comparator CM1, so that said discriminating reference voltage range $\alpha$ for the output level of the differentiator 9 may be settled to V2-V1. In the embodiment, the output |dTE/dt| of the differentiator 9 is zero, when the tracking signal TE which assumes the form of a sinewave gets to the maximum value. Therefore, the output |dTE/dt| corresponding to said positive reference value V2 and said negative reference value V1 of the differentiator 9 comes out before and after the maximum value of the tracking error, as shown in FIG. 6a.

Said comparators CM1 and CM2 put out the positive voltage Vcc or the negative voltage $V_{EE}$ in response to the output level of the differentiator 9. The resistors R1 and the power source Vcc coupled to the output terminals of the comparators CM1 and CM2 and the operational amplifier CM3 effect a level shift function against the outputs of said comparators and operational amplifier such that the negative power voltage $V_{EE}$ is up to 0 volt.

The AND gate AG implements logic product with respect to level-shifted outputs of the comparators CM1 and CM2. The pulse S1 generated from the AND gate AG has the pulse width corresponding to the detecting time of the tracking error level which is larger than TEk. Hereinafter the pulse S1 is referred to as a high tracking error detecting signal.

The high tracking error detecting signal S1 is input to the system controller 3 of FIG. 2. Also, the detecting signal S1 distributed by the resistors R2 and R3 is applied to the positive terminal of the operational amplifier CM3.

The amplifier enable signal S2 generated in the system controller 3 in response to said high tracking error detecting signal S1 is applied to the base of the transistor Q1 through the resistor R5. The collector and the emitter of the transistor Q1 are connected to the negative terminal of the operational amplifier CM3 and the ground, respectively.

The negative terminal of the operational amplifier CM3 is connected to its output terminal through the resistor R4 and concurrently, is connected to one end of the condenser C0 the other end of which is grounded.

In fact, in response to the amplifier enable signal S2 indicating 0 volt for a time corresponding to the width of the high tracking error detecting signal S1, the transistor Q1 turns off and the amplifier CM3 amplifies the signal applied to its noninverting terminal.

Level shift means consisting of the resistor R1 and the power source Vcc shifts the negative voltage $V_{EE}$ generated from the output of the amplifier CM3 to 0 volt, so that the grating adjustment stop signal So may be produced. The pulse width of the signal So is determined by the resistors R2, R3 and R4 and the condenser Co. Further, the transistor Q1 turns on and so plays a role in discharging any charged voltage in the condenser Co when the amplifier enable signal S2 gets to the positive voltage Vcc.

Before the lowest limit TEk of the target value of grating adjustment is detected, the motor driving stage 11 generates the driving signal which can rotate the motor 12 in designated direction according to the output |dTE/dt| of the differentiator 9. Besides, just after said value TEk is detected, it interrupts propagation of the output signal of the differentiator 9. Coincidently, it receives the grating adjustment stop signal So from the discriminator 10 and subsequently, generates the brake signal which halt the motor 12.

The motor 12 has a function to be able to rotate in the right and opposite directions. The jig actuator 13, comprising several gears as not shown in the accompanying drawings, receives rotational torque of the motor 12 and makes the jig J for adjusting the grating in the pick-up rotate at an angle of desired degree.

Figure 4:
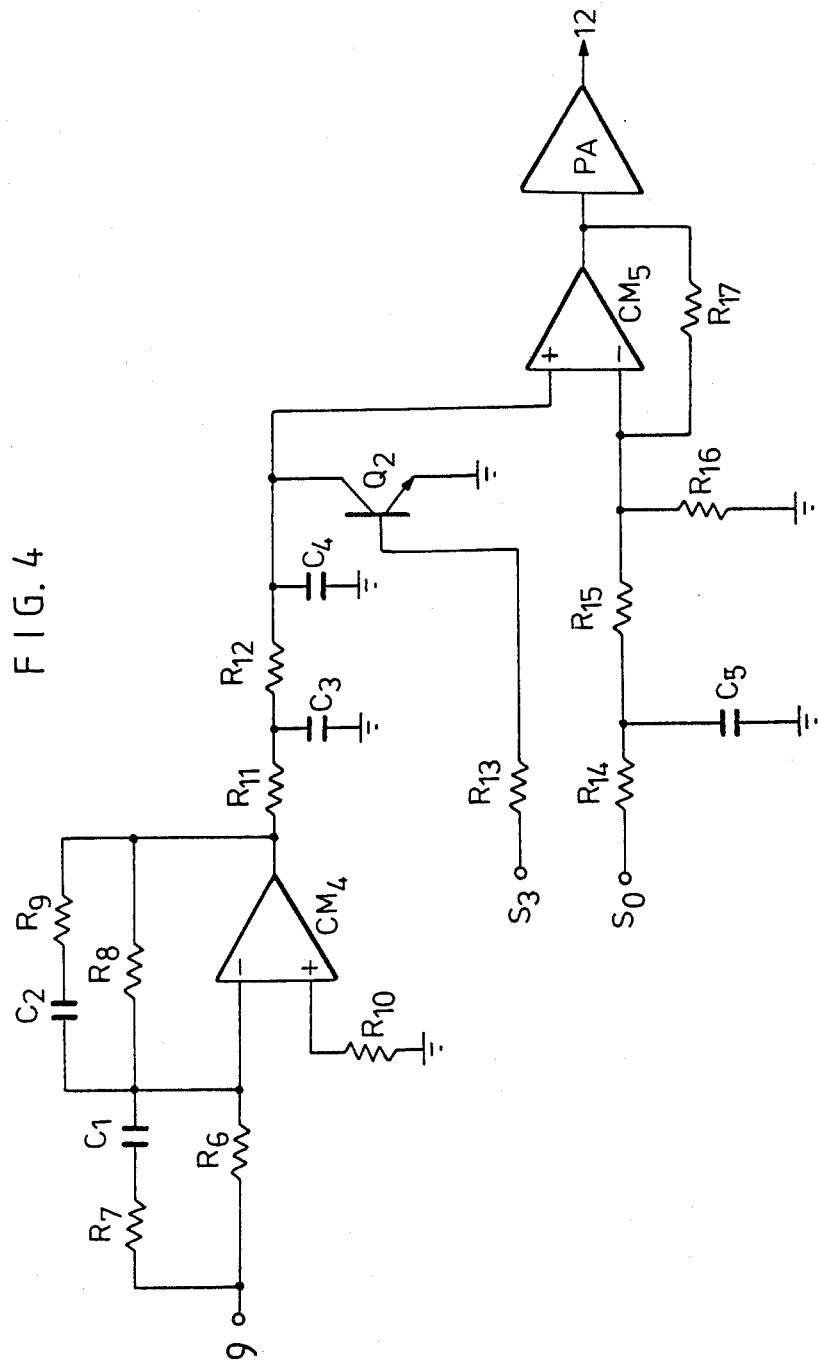
FIG. 4 is a detailed circuit diagram of the motor driving stage shown in FIG. 2.

FIG. 4 depicts the detailed circuit diagram of the motor driving stage 11 shown in FIG. 2. In this drawing, the operational amplifier CM4, the resistors R6 through R10 and the condensers C1 and C2 form the phase lead compensator having a function to lead the phase of the output of the differentiator 9, in consideration of the phase delay in the motor 12. The resistors R11 and R12 and the condensers C3 and C4 form the first low pass filter for removing the noise of the output of the differentiator 9. And, the resistor R14 and the condenser C5 form the second low pass filter for removing the noise of the grating adjustment stop signal So from the discriminator 10.

The output of the second low pass filter is connected to the inverting terminal of the operational amplifier CM5 via the level controller consisting of the resistor R15 and R16. The output of the first low pass filter is connected to the noninverting terminal of the operational amplifier CM5, and the output of the operational amplifier CM5 is connected to its inverting terminal through the feedback resistor R17.

In a way, the interrupt means consist of the transistor Q2 and the base resistor R13 connected between the noninverting terminal of the operational amplifier CM5 and the first low pass filter, When the tuned indicating signal S3 being step waveform is generated from the system controller 3 in response to the rising edge of the high tracking error detecting signal S1, the interrupt means force the output terminal of the first low pass filter to be grounded, so that the output of the differentiator 9 is prevented from propagating to the noninverting terminal of the operational amplifier CM5.

In the end, the operational amplifier CM5 generates the motor driving signal and the motor brake signal trained sequentially at the same time base as the waveform vi shown in FIG. 6b in response to the output signal of the differentiator 9 and the grating adjustment stop signal So from the discriminator 10 respectively applied to its respective input terminals. The output of the operational amplifier CM5 is amplified by the power amplifier PA and, in turn, is applied to the motor 12.

Figure 5:
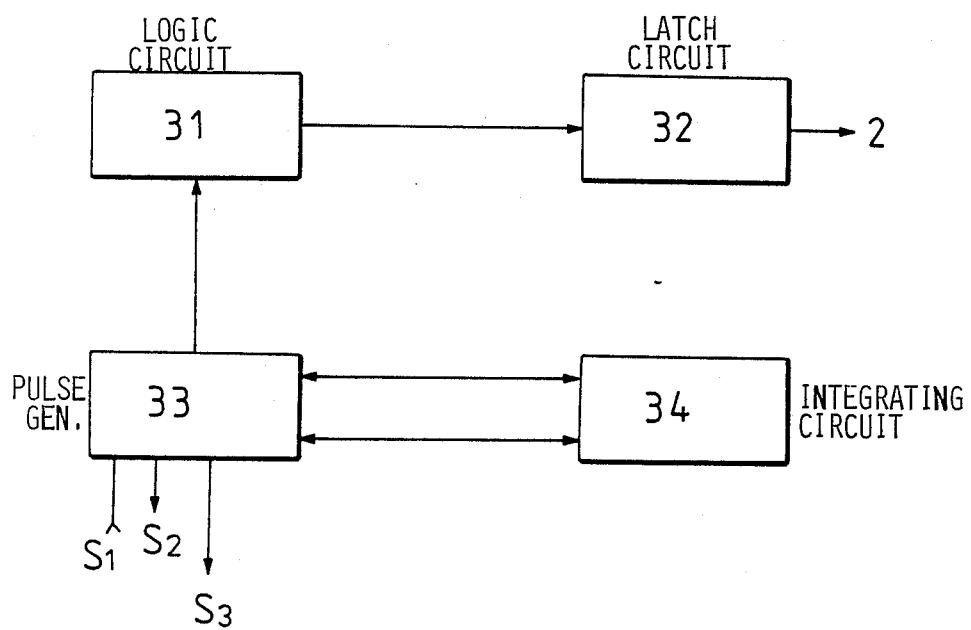
FIG. 5 is a schematic block diagram of the system controller shown in FIG. 2, and FIG. 6a and FIG. 6b are timing charts for explaining operation of the discriminator shown in FIG. 3 and the motor driving stage shown in FIG. 4.

As shown in FIG. 5, the system controller 3 comprises the logic circuit 31, the latch circuit 32, the pulse generator 33 and the integrating circuit 34. Said logic circuit 31 generates the amplifier enable signal S2 and the tuned indicating signal S3, in response to the high tracking error detecting signal S1 from the discriminator 12 for adjusting the grating. Besides, it generates the control signal for controlling the focus servo unit.

The latch circuit 32 stores the temporary operation value of the logic circuit 31. The pulse generator 33 generates the rectangular wave by means of the starting enable signal from the logic circuit 31. The intergrating circuit 34 intergrates the rectangular wave into the triangular wave and applies the converted triangular wave to the focus servo unit 2. The tuned indicating signal S3 generated from the logic circuit 31 in the system controller 3 not only interrupts the output of the differentiator 9 but also drives the indicator 14, so that it exhibits that the grating angle has been reached at the desired angle.

As for the apparatus of the above stated configuration according to the present invention, the step for adjusting the grating automatically is as follows:

First, if the power is on, the system controller 3 is initialized and then, carrys out the auto focus function by controlling the focus servo unit 2. By means of the auto focus function, the optical pick-up 1 becomes just focus condition with respect to a compact disk.

Under these conditions, the sub-beam currents E and F from the optical pick-up 1 is respectively converted into voltage signals by current-voltage transducing amplifier 4 and 5. Converted voltage signals are applied to the differential amplifier 6 and the differential amplifier 6 puts out the tracking error signal TE mixed with the main data signal EFM as the waveform i shown in FIG. 6a. The main data signal EFM and the channel noise as not shown in the drawing are removed, while the output of the differential amplifier 6 passes through the band pass filter 7. Accordingly the pure tracking error signal is obtained, as the waveform ii shown in FIG. 6a. This tracking error signal is, after its phase is compensated by the low frequency lag compensator 8, applied to the differentiator 9. Then the signal, which indicates the derivative variable of the tracking error signal TE per time as the waveform iii shown in FIG. 6a, is obtained. And this signal is applied to the discriminator 10.

For reference, waveforms iv through x of FIG. 6a are illustrated for explaining the operation of the essential parts of the discriminator 10, which is shown in FIG. 3 and distinguishes the output level of the differentiator 9.

When the detected tracking error signal TE is far smaller than the lowest limit TEk of the target value of the grating adjustment, the jig actuator 13 regulates the grating angle in the direction that the tracking error is increased by rotating the motor 12.

At this time, the differentiator 9 becomes the driving signal generator of the motor 12. When the output level of the differentiator 9 is larger than the positive reference voltage V2 as the waveform iii shown in FIG. 6a, the outputs of comparators CM1 and CM2 reveal the negative voltage $V_{EE}$ and the positive voltage Vcc respectively, so that the output S1 of the AND gate AG becomes 0 volt and the system controller 3 generates the signal S2 of the positive voltage Vcc.

Accordingly, the transistor Q1 turns on and forms the discharge path of the condenser Co, so that the operational amplifier CM3 is unable to be operated. At this time, the negative voltage $V_{EE}$ from the output of the operational amplifier CM3 is shifted to 0 Volt by such level-shift means.

As stated in the above, when the grating adjustment stop signal So becomes 0 Volt, the motor 12 is not subject to the brake. As a result, the output of the differentiator 9 is compensated as the waveform iii shown in FIG. 6b through the lead compensator and the first low pass filter in the motor driving stage 11. The compensated output is applied to the noninverting terminal of the operational amplifier CM5.

The signal applied to the operational amplifier CM5 is exhibited in its output stage without any inversion of the phase and is amplified by the power amplifier PA and then, is applied to the motor 12. The driving torque of the motor 12 gradually decreases as the waveform vi shown in FIG. 6b according to the tracking error signal TE approaching at the maximum value. Subsequently, when the output level of the differentiator 9 is reached at the positive reference voltage V2, the output of the comparator CM1 is converted from the negative voltage $V_{EE}$ into the positive voltage Vcc. At the time, the output of the comparator CM2 is continuously maintained at the positive voltage Vcc. Accordingly the AND gate AG is synchronized at the rising edge of the output of the comparator CM1, so that the high tracking error detecting signal S1 of the positive voltage Vcc is generated from the AND gate AG. In response to said signal S1, the system controller 3 generates the amplifier enable signal S2 of 0 Volt to turn off the transistor Q1, so that the operational amplifier CM3 is enabled.

Therefore, when the signal S1 is applied to the noninverting terminal of the operational amplifier CM3, the grating adjustment stop signal So of the positive voltage Vcc is generated from the output terminal of level-shift means as waveform ix or iv shown in FIGS. 6a or 6b.

The signal So is compensated by the second low pass filter and the level controller in the motor driving stage 11 as the waveform v shown in FIG. 6b and is applied to the inverting terminal of the operational amplifier CM5. Concurrently, the system controller 3 generates the tuned indicating signal S3 of the positive voltage Vcc to turn on the transistor Q2, so that the output stage of the first low pass filter in the motor driving stage 11 is forced to be grounded. Accordingly, the output of the differentiator 9 is not transferred to the noninverting terminal of the operational amplifier CM5, and the noninverting terminal of the operational amplifier CM5 becomes 0 Volt. In the end, the operational amplifier CM5 inverts only the grating adjustment stop signal So applied to its inverting terminal as the waveform v shown in FIG. 6b and makes the motor 12 brake by means of the output signal inverted and also compensates the rotation error owing to inertia. At this time, the indicator 14 receives the tuned indicating signal S3 and indicates that the grating is adjusted to the desired angle.

The width of the grating adjustment stop signal So which compensates the brake and the rotation error of the motor 12 is determined by the negative reference voltage V1 established in the discriminator 10. Accordingly, if the output level of the differentiator 9 is attained to the negative reference voltage V1, the output of the comparator CM2 is dropped to the negative voltage $V_{EE}$, so that the output S1 of the AND gate AG is dropped to 0 Volt.

Therefore, the system controller 3 generates the signal of the positive voltage Vcc and makes the grating adjustment stop signal So become 0 Volt, and the output of the comparator CM5 becomes 0 Volt, too. Therefore the grating adjustment is completed. At this time, the indicator 14 consistently indicates the condition that the grating adjustment is completed, until the system controller 3 is reset again.

As described above, the present invention is provided to be able to make the grating adjustment more precisely and readily than any other prior art. Accordingly the present invention has not only a high efficiency in working but also a high reliability in the quality of products.

While there has been described what is now considered to be the preferred embodiment of the invention, it will be understood that various modifications may be made therein, and it is intended to cover in the appended claims all such modifications as fall within the true spirit and scope of the invention.

What is claimed is:

1. A grating adjustment apparatus for adjusting the grating of an optical pick-up by using a tracking error signal including an optical pick-up for scanning laser beam in a compact disk and reading the signal recorded in the disk, two current-voltage converting amplifiers for converting sub-beam current signals from said optical pick-up into voltage signals, a differential amplifier subtracting the outputs of said two current-voltage converting amplifiers and generating a tracking error signal, wherein the improvement comprising a band pass filter for removing the noise of the output of said differentiator and detecting a pure tracking error signal, a low frequency lag compensator for doing lead compensation to the high frequency of the output signal of said band pass filter and restricting the bandwidth of the open loop gain of said apparatus, a differentiator generating the derivative variable of the output of said low frequency lag compensator according to the time variable, a discriminator for distinguishing the output level of said differentiator, a system controller for generating a tuned indicating signal and an amplifier enable signal which makes a discriminator put out a grating adjustment stop signal at the time that a tracking error is detected larger than the value by said discriminator, a motor driving stage for putting out a motor driving signal in response to the output of said differentiator when the tracking error signal is detected smaller than the predetermined value by said discriminator and a motor brake signal in response to the grating adjustment stop signal from said discriminator and the tuned indicating signal from said system controller when the tracking error signal is detected larger than the predetermined value by said discriminator, a reversible motor rotating or halting according to the output of said motor driving stage, a jig actuator for having a jig rotate in desired angle so as to adjust the grating in optical pick-up by receiving the rotational torque of said motor, and an indicator for accomplishing display motion by receiving a tuned indicating signal from said system controller.

2. A grating adjustment apparatus as claimed in claim 1, characterized in that said discriminator comprises at least means for establishing the positive reference voltage and the negative reference voltage, means for comparing the output of said differentiator with said respective reference voltages, means for carrying out the logic product to the outputs of said comparing means, and means for enabling said amplifying means at the time that the tracking error signal is detected larger than the predetermined value.

3. A grating adjustment apparatus as claimed in claim 1, characterized in that said motor driving stage comprises at least means for doing lead compensation to the phase of the output of said differentiator in consideration of phase delay in said motor, the first low pass filter for removing the noise in the output of said differentiator, means for forcing the output terminal of the said first low pass filter to be grounded at the time that the tuned indicating signal occurred from said system controller, the second low pass filter for removing the noise of the grating adjustment stop signal from said discriminator, means for controlling the output level of the said second low pass filter, means for putting out a motor driving signal and a motor brake signal trained sequentially at the time base by receiving the output of the first low pass filter and the level-adjusted output of the second low pass filter, and means for power-amplifying said motor driving signal and said motor brake signal.

* * * * *